3,360,583
**PREPARATION OF POLYENES VIA CHLORO-
ETHER. ISOPRENE FROM FORMALDEHYDE
AND ISOBUTENE**
David W. Hall, Englewood, and Edward Hurley, Jr.,
Littleton, Colo., assignors to Marathon Oil Company,
Findlay, Ohio, a corporation of Ohio
No Drawing. Filed May 24, 1965, Ser. No. 458,432
49 Claims. (Cl. 260—681)

ABSTRACT OF THE DISCLOSURE

Preparation of polyolefins by reacting a haloether and an olefin and splitting hydrogen halide and alcohol from the intermediate adduct.

---

This application relates to the preparation of polyenes and more particularly to the preparation of these materials by reacting halo-substituted ethers with olefins, splitting the resulting haloether adduct, and separating the resulting halide and polyolefinic compound.

German Patents 647,192, issued July 12, 1937, and 671,063, issued January 31, 1939, teach the formation of 3-chloro-3-methylbutyl methyl ether from chloromethyl methyl ether and isobutene. Japanese patent, Showa, 39–3414, issued April 2, 1964, listing K. Tiwanki et al. as inventors teaches the reaction of acetals with olefins at high temperatures to obtain olefinic ethers which are cleaved to form conjugated di-olefins. Dehydrohalogenation to form olefins is well known to the chemical industry.

Conjugated di-olefins are important to the elastomer and insecticide industries, and better processes for the preparation of these important monomers are needed. This invention provides a method for the preparation of a variety of these important chemicals from simple raw materials, at relatively low temperatures, with a minimum of catalyst loss and with good yields. Essentially, this invention comprises reacting $\alpha$-haloethers with olefins and splitting out a hydrogen halide and an alcohol from the resulting haloether adduct to form a desired conjugated diene.

The invention will be described: (1) in terms of its broader aspects, (2) in terms of a preferred process, (3) in terms of variations on the general process, and (4) in specific examples.

Essentially, the invention comprises reacting an $\alpha$-haloether with an olefin to form a haloether adduct of the olefin, splitting alcohol and hydrogen halide from the haloether adduct to form a conjugated polyolefin, and separating the halide and polyolefin.

A variety of $\alpha$-haloethers are useful in this process. $\alpha$-Monohalo lower alkane ethers, either unsymmetrical or symmetrical, are preferred. Preferably, the haloethers are substituted in the alpha position with chloro, bromo, or iodo and are methyl, ethyl, or propyl ethers. $\alpha$-Haloethers useful in this process include symmetrical haloethers, such as bis(chloromethyl)ether, bis($\alpha$-bromoethyl)ether, bis($\alpha$-iodopropyl)ether; unsymmetrical ethers, such as $\alpha,\beta$-dichloro diethyl ether, dichloromethyl methyl ether, chloromethyl dodecyl ether, chloromethyl p-chlorophenyl ether, $\alpha$-bromomethyl ethyl ether, $\alpha$-iodomethyl propyl ether, chloromethyl phenyl ether, etc.; and cyclic ethers, such as 2,5-dichlorotetrahydrofuran, $\alpha$-phenyl-$\alpha$-chloromethyl pyrocatechol, 2,3-dichlorotetrahydropyran, etc.; and monochloroethylene carbonate.

Reactive olefins useful in this process are those which are not spatially or sterically prevented from reacting with a desired haloether under a given set of reaction conditions. Useful olefins include the halogen-substituted olefins, preferably mono-halogen atom substituted on an olefinic carbon atom. Additional halogen atoms can be present on other carbon atoms; aromatic hydrocarbon-substituted olefins; and saturated aliphatic-substituted olefins as well as the unsubstituted hydrocarbon olefins. Examples of such olefins include allylchloride; allylbromide; 3-methyl-3-butenyl methyl ether; 2-fluoropropene; butadiene; isoprene; 2-chloropropene; cyclohexene; styrene; p-chlorostyrene; ethylene; 2-butene; propylene; 3-methylbutene 1-pentene; 2-pentene; 2-methyl-2-butene; 1,3-pentadiene; 2,3-dimethyl-1,3-butadiene; 2,3-dimethyl-2-butene; 1,3-cyclohexadiene; 2,4-hexadiene; 1-octene; cyclohexylethylene; allylbenzene; etc. Preferably, the olefins used as raw materials in this process have 2–9 carbon atoms.

The adduction of the haloether to the olefin is carried out in the presence of a catalyst. Generally, Friedel-Crafts catalysts are operative in the process of this invention. Zinc chloride, titanium tetrachloride, aluminum chloride, ferric chloride, and mercuric chloride are preferred catalyst, though other metal halides are known to be effective in haloether additions.

The haloether adduct preparation is preferably accomplished in the liquid phase. A gaseous olefin can be sparged through a liquid ether or a solid ether in solution in an inert solvent. Alternately, the reactants can be run countercurrent through a column packed with catalyst in a continuous process. Generally, the reaction goes well at room temperatures. A preferred temperature range is from about $-30$ to about $70°$ C., and a more preferred range is from about 5 to about $35°$ C. Generally, a solvent is not required in the haloether adduct formation though, where necessary, solvents such as chloroalkanes—for example, carbon tetrachloride and dichloro ethane—and alkane ethers such as diethyl ether can be utilized for solid olefins or haloethers where sufficient heat to melt the solids is not available or the required heat is uneconomic.

As previously indicated, the haloether adduct is cleaved to form a desired conjugated polyene. The cleavage is carried out in the presence of a protonic catalyst, generally the hydrogen ion is formed from a small amount of hydrogen halide which is present in the reaction mixture. Cleavage goes particularly well when substantially all of the hydrogen halide formed during the reaction is inactivated or removed as formed. The term "separating" is intended to include separation of the hydrogen halide by fractional distillation, preferentially dissolution in a second phase, by interacting the hydrogen halide with a salt or complex forming material, or other means. Examples of such methods are briefly reviewed below.

This may be accomplished by complexing the halide ion with a base material such as N-ethylpyrrolidone or by taking advantage of the preferential solubility of hydrogen halides in alcohols, preferably lower alkanols, and other solvents to pass the halide ion into a separate phase in a multiphase reaction system. The halide can also be removed by suitable ion exchange resins or by quenching the reaction mixture to remove either the olefin or the hydrogen halide as a liquid.

It is necessary to remove or deactivate (i.e., form a salt or complex) the halide from the reaction medium to prevent a re-addition of the halide to the olefin, thus producing polyhalogenated alkanes and olefins. The temperature at which the cleavage step is carried out will vary with the catalyst used and the mechanism for removing hydrogen halide. Generally, the cleavage step is carried out at temperatures ranging from about $50$–$500°$ C. and preferably from about 90 to about $250°$ C.

The present invention has, heretofore, been described in its broad aspects. The process will now be described in terms of a preferred specific process. The mechanisms and techniques described in this process are applicable to the preparation of other olefins from other raw materials.

Gaseous hydrogen chloride, chlorosulfonic acid, etc., is sparged into a mixture of methanol and paraformaldehyde at a molar reactant ratio of approximately 1+:1:1 hydrogen chloride:methanol:formaldehyde at temperatures ranging from about 0 to about 25° C. to form, on an equimolar basis, chloromethyl methyl ether and water. The chloro-methyl methyl ether and a crude $C_4$ refinery stream are then mixed in the presence of between 0.01 and 0.05 mole of catalyst per mole of chloromethyl methyl ether. Substantially larger amounts of catalyst cause polymerization of the adduct through dehydrohalogenation and ether cleavage.

A typical $C_4$ refinery stream contains between about 5 and 35% isobutylene, between 5 and 45% 2-butene, between 5 and 20% 1-butene, and varying amounts of saturated $C_4$ hydrocarbons. The 2-butene and isobutene in the feed stream react with chloromethyl methyl ether and, on cleavage, form isoprene. 1-Butene does not react with the chloroether unless there is a large excess of the ether. The 3-chloropentyl methyl ether adduct is difficult to cleave at temperatures at which the butenyl ether adducts cleave and, therefore, would not contaminate the final isoprene even if some reaction should occur between the ether and 1-butene.

If, for some reason, one did desire to operate in the presence of a large excess of chloromethyl methyl ether, the $C_4$ refinery stream can be passed through an isomerization reactor to convert the 1-butene to 2-butene. A sodium on activated alumina catalyst can be used for this purpose (see Advances in Catalysis, vol. 12 (1960), p. 119–21).

The 3-methyl-3-chlorobutyl methyl ether containing stream is heated to about 150° C. in the presence of N-methyl-pyrrolidone which forms a partially dissociated complex with hydrogen chloride as it is formed during the cleavage process.

Solvents—for example, the tertiary amides—which complex the hydrochloric acid should be inert to the haloether adduct and the forming olefin but can form substantially undissociable hydrogen halide complexes if such a product is desired. Preferably, the solvents utilized form hydrogen halide salts which dissociate partially on heating at temperatures between about 50 and 200° and preferably between about 50 and about 170° C. Ordinarily, only one mole of solvent per mole of haloether adduct is required though more can be utilized as desired.

The isoprene formed during the reaction is removed and the methanol and hydrochloric acid are recycled for the preparation of additional chloromethyl methyl ether on addition of additional aldehyde.

The invention has been described in general terms and more specifically in terms of one process. It is obvious that many variations on this process are available to the skilled operator who wishes to carry out the process of this invention in conjunction with other refinery or chemical plant processes. In a variation on the above processes, the cleavage step is carried out in the presence of a large excess of alcohol which acts as a solvent for the hydrochloric acid. The acid solution, when made up with additional acid and aldehyde, can be utilized in the preparation of the raw material ether. If such a process is used, the cleavage is carried out at temperatures ranging from about 75 to about 200° C. and preferably from about 125 to about 175° C. In an alternative procedure, the haloether adduct is dehydrohalogenated to remove hydrogen halide which is separated from the reaction mixture by a strong base such as potassium hydroxide, pyridine, trimethyl amine, etc.; an ion exchange resin; distillation; etc. The resulting olefinic ether is then converted to isoprene by thermal cracking at temperatures in the range of about 350 to about 650° C. or by catalytic cracking in the presence of silica, alumina, etc., at temperatures ranging from about 150 to about 450° C.

The following examples more fully illustrate the present invention.

EXAMPLE 1

Chloromethyl methyl ether (120 grams) is mixed with 2 grams of titanium tetrachloride (0.0106 mole) in a pressure equalized dropping funnel. This mixture is added dropwise to 200 grams of isobutylene (3.5 moles) in a 500-ml. 3-neck round bottom flask fitted with a magnetic stirrer, thermometer, and Dry Ice condenser. The addition is carried out at the reflux temperature of the reaction mixture, initially about −10° C. and toward the end of addition about 0° C., over a period of two hours. The reaction mixture is then warmed to room temperature with the concomitant removal of part of the excess isobutylene.

N-methylpyrrolidone (253 grams) is then added to the crude reaction product and the resulting mixture heated for three hours at a temperature of 130° C. During this distillation the remaining isobutylene is boiled off and the reflux ratio is adjusted such that intermediate products are continually returned to the reaction flask. In this manner, complete conversion of the 3-chloro-3-methylbutyl methyl ether to isoprene is achieved. Isoprene (74.8 grams) is obtained. Based on the 1.204 moles of chloromethyl methyl ether employed as a starting material, a 91.4% yield of isoprene is obtained.

EXAMPLE 2

An apparatus for synthesizing chloromethyl methyl ether consisted of an upright tubular glass vessel 2″ in diameter and 18″ long and a stirrer which extended to within ½″ of the bottom of the vessel. To the sealed bottom of the vessel was attached a stopcock. Two crystallizing dishes, bored out to the diameter of the vessel, were ring-sealed to the vessel to serve as cooling baths. Between the top bath and the joint for receiving the stirrer bearing was attached a gas exit tube. This was connected to a bubble-type, gas flow indicator device and to a Dry Ice trap. Attached diametrically opposite this gas exit was an inner 24/40

$$\begin{array}{c}T\\S\end{array}$$

joint. This opening served as an inlet for solid and liquid reagents, and was sealed with a 24/40 stopper during runs. Running down the outside of the apparatus from its uppermost part, and entering very near the bottom of the apparatus, was a gas inlet tube.

The apparatus provides for thorough mixing of the reagents and separation of the aqueous and organic phases formed during the preparation of chloromethyl methyl ether. To the reactor was added paraformaldehyde [Matheson, minimum claimed $CH_2O$, 95%; found by actual analysis, 96%; 66.9 g. (2.14 moles)], and methanol [Merck, reagent, 67.8 g., 2.12 moles]. The mixture was stirred vigorously and cooled to ∼10° C. while gaseous HCl was introduced. After about one hour, the gas flow device attached to the exit tube indicated that HCl absorption had ceased.

The mixture was permitted to warm to room temperature, and stirring was discontinued to allow the two phases to separate. The lower aqueous phase, saturated with HCl and containing some methanol, formaldehyde and a very small amount of methylal, was drained into a tared flask containing a weighed amount of distilled water. The weight of this lower phase was 86.4 g.; it was found to contain 4.39 g. formaldehyde (this figure includes formaldehyde from all sources present in the solution such as, for example, methylal).

Anhydrous $MgSO_4$ (10 g.) was added to the crude chloromethyl ether and the mixture was stirred at room temperature for four hours. After this drying treatment, $ZnCl_2$ (4 g.) was added and then gaseous isobutylene was introduced over a period of four hours. This reagent was introduced at a fairly low flow rate until it began to condense from the surface of the tube adjacent to the upper cooling bath (now filled with Dry Ice-acetone). The reaction temperature was maintained between 0° and 15° C. during the course of the addition. After the addition of isobutylene was complete, the coolant in the lower bath was drained and the mixture was permitted to exotherme to 30° C. When the mixture had cooled to 25° C., it was purged with a gentle stream of nitrogen for four hours. Isobutylene (35 g.), t-butyl chloride (6.5 g.) and methylal (2.2 g.) were collected in the Dry Ice trap connected to the gas exit tube.

The crude adduct (254.1 g.) was added to N-methylpyrrolidone (209 g.) for distillation. The temperature of the distillation pot ranged from 110° C. to 150° C. Isoprene (1.38 moles), methyl chloride (0.89 mole), methanol (0.83 mole), t-butyl chloride (0.18 mole) and methylal (0.08 mole) were collected as a mixture from this step. Gas-liquid chromatographic analysis of the crude adduct indicated 15 g. (nearly 0.2 mole) methylal present at that stage of the experiment.

The yield of isoprene, based on 2.14 moles of pure $CH_2O$ charged initially, is 64.5%. Formaldehyde conversion is 85.5%.

EXAMPLE 3

Chloromethyl methyl ether was synthesized by the process of Example 2. The lower aqueous phase (82.3 g.) was found to contain 0.184 mole of $CH_2O$. The procedure was changed from that outlined in Example 2 in subsequent steps. The crude chloromethyl methyl ether (148.8 g.) was drained from the reactor and dried over anhydrous sodium sufate. The bulk of the crude ether was carefully distilled under dry nitrogen; a center cut (76.1 g.) was collected and used in the isobutylene addition step. The residues from drying and distillation were hydrolyzed and then analyzed for $CH_2O$. Formaldehyde suitable for recycle in the process was recovered in the amount of 0.86 mole.

The distilled chloromethyl methyl ether was added to isobutylene, using 2 g. $TiCl_4$ catalyst. The crude adduct (119.4 g.) was mixed with N-methylpyrrolidone (190.1 g.) and isoprene (0.84 mole) was collected by the usual distillation procedure. Methylal (7.6 g.; 0.1 mole) was also collected; this material constitutes 0.1 mole formaldehyde available for recycle. Thus, a total of 1.14 moles of formaldehyde in forms suitable for recycle was recovered. The yield of isoprene, based on formaldehyde charged initially, is 39.3%. Formaldehyde conversion is 46.8%. Therefore, in the entire run only 7.5% of the formaldehyde charged initially was lost. The yield of isoprene based on the moles of pure chloromethyl methyl ether (76.1 g. minus the 7.6 g. methylal recovered; 0.85 mole) used in the isobutylene addition step is 98.5%, demonstrating the excellent yield of isoprene which can be obtained from the chloromethyl methyl ether when methylal, generally present in any chloromethyl methyl ether sample, is recovered without mechanical or chemical loss.

EXAMPLE 4

Three samples of 3-chloro-3-methylbutyl methyl ether are heated in Fischer Porter glass pressure tubes for 30 minutes at 165° C. In each case, 5 ml. of 3-chloro-3-methylbutyl methyl ether is used. In run No. 1, 5 ml. of methanol is added to the 3-chloro-3-methylbutyl methyl ether. In run No. 2, no methanol is used. In run No. 3, 5 ml. of methanolic HCl is employed. The results of these three runs are set forth in Table I.

TABLE I.—EFFECT OF ADDED METHANOL ON PYRROLYSIS OF 3-CHLORO-3-METHYLBUTYL METHYL ETHER IN A FISCHER PORTER TUBE

| Component | Percent Composition, Uncorrected GLC Area Ratio | | | |
|---|---|---|---|---|
| | Initial | Run One Methanol Added | Run Two Nothing Added | Run Three Methanolic HCl Added [a] |
| Methyl chloride | | 5.2 | 2.4 | 8.7 |
| Isoprene | [b] 0.9 (1.0) | [b] 9.8 (39.4) | [b] 7.2 (8.8) | [b] 34.1 (41.2) |
| t-Butyl chloride | 8.9 | 2.4 | 11.6 | 5.5 |
| Methanol | 6.8 | 75.0 | 18.2 | 17.3 |
| Externally unsaturated ether | 5.8 | 3.2 | 9.8 | 9.5 |
| Unidentified | | 0.2 | 0.2 | |
| Unsaturated ether | 0.8 | 0.3 | 1.3 | 23.9 |
| Isoprene hydrochloride | 2.1 | 2.4 | 3.5 | 1.0 |
| Unidentified | 4.7 | | 1.2 | |
| 3-chloro-3-methylbutyl methyl ether | [b] 69.9 (75.3) | [b] 1.4 (5.6) | [b] 44.6 (54.5) | |
| Unidentified high boiler | | | | |

[a] Two layers formed. Analysis of the upper layer is given. Lower layer was nearly pure methanolic HCl.
[b] Composition calculated disregarding methanol present.

It is clear from Table I that methanol promotes the conversion of 3-chloro-3-methylbutyl methyl ether to isoprene. The isoprene forms an upper separate layer from which it may be conveniently recovered. Most of the HCl eliminated from the 3-chloro-3-methylbutyl methyl ether remains in the lower methanol layer and does not add to the isoprene in the upper layer.

EXAMPLE 5

Dimethylformamide can also be used to promote the conversion of 3-chloro-3-methylbutyl methyl ether to isoprene.

Crude 3-chloro-3-methylbutyl methyl ether (32 grams) is mixed with 90 ml. of dimethylformamide and refluxed for six hours. A 56% yield of isoprene is obtained.

EXAMPLE 6

Tertiary butyl alcohol is also an effective reagent for use in converting 3-chloro-3-methylbutyl methyl ether to isoprene.

Crude 3-chloro-3-methylbutyl methyl ether (38.5 grams) and 126 grams of t-butyl alcohol are heated in a stirred autoclave for four hours at a temperature ranging from 100° C. A 75% yield of isoprene is obtained.

EXAMPLE 7

In this example, a $C_4$ refinery stream having the following composition in weight percent is used: 1% propane, 31.9% isobutane, 15.3% n-butane, 13.4% trans-2-butene, 10.6% cis-2-butene, 10.8% 1-butene, and 17.0% isobutylene.

This refinery stream (81.3 grams) is bubbled into a mixture of 0.25 mole chloromethyl methyl ether and 0.5 gram of zinc chloride over a period of 95 minutes, with the reaction temperature maintained at 15° C. by external cooling. A nearly quantitative conversion of chloromethyl methyl ether is obtained.

By gas liquid chromatography, it is determined that the crude reaction mixture contains the following components in GLC area percent: 43.5% 3-chloro-3-methylbutyl methyl ether, 6.7% 2-methyl-3-chlorobutyl methyl ether (2-butene adduct), and 0.6% 3-chloropentyl methyl ether (1-butene adduct). This mixture of adducts is converted to isoprene by refluxing it with N-methylpyrrolidone as in Example 1.

EXAMPLE 8

Crude 3-chloro-3-methylbutyl methyl ether was distilled through an 18″ column packed with glass helices. A center cut was found to be 98% pure. The sample was permitted to stand for two days at room temperature with no further treatment. GLC analysis of the sample at this point indicated that it was now only 85% pure. The unsaturated ether intermediates constituted the bulk of the additional 15%. A small amount of isoprene formed via spontaneous decomposition.

EXAMPLE 9

As illustrated in Example 1, the mixture of chloromethyl methyl ether and catalyst can be added to the isobutylene instead of employing the inverse addition. This technique can be employed also when crude $C_4$ refinery streams are used.

Chloromethyl methyl ether (0.25 mole) mixed with 1.0 gram of titanium tetrachloride is added dropwise over a period of 90 minutes to a condensed $C_4$ refinery stream having the same composition as the stream used in Example 7. A large excess of the stream over the amount required to react with the chloromethyl methyl ether is employed. The reaction temperature is maintained between —8° C. and 0° C. during the addition. After the addition of the chloromethyl methyl ether and catalyst, the reaction mixture is stirred for an additional three hours and the excess $C_4$ permitted to distill. Analysis of the crude reaction mixture reveals that it contained the following materials in GLC area ratio: 75.3% 3-chloro-3-methylbutyl methyl ether, 1.6% 2-methyl-3-chlorobutyl methyl ether, 0.1% 3-chloropentyl methyl ether.

The crude mixture of olefins can be refluxed with N-methylpyrrolidone as in Example 1 to produce isoprene. In this instance, no piperylene is detected by GLC analysis of the isoprene.

It is clear from the results of this experiment that the reaction of chloromethyl methyl ether with crude $C_4$ refinery streams is highly selective to the formation of 3-chloro-3-methylbutyl methyl ether.

EXAMPLE 10

3-chloro-3-methylbutyl methyl ether (70.6 grams) is mixed with 141.1 grams of aniline and heated for two hours at 136° C. in a 500-ml. 3-neck round bottom flask fitted with a magnetic stirrer, thermometer and Dry Ice condenser. No isoprene is formed. Upon analysis of the reaction by gas chromatography, it is found that 36 grams of 3-methyl-3-butenyl methyl ether are present.

The 3-methyl-3-butenyl methyl ether is converted to isoprene by contacting it with a zinc oxide on silica catalyst containing 20% zinc oxide at 300° C. at atmospheric pressure.

EXAMPLE 11

Chloromethyl methyl ether (80.5 grams) is added to 70 grams of 2-methyl-2-butene (1 mole) in 500 grams of liquid sulphur dioxide. The reaction mixture is stirred for seven hours at —9° C. Following this, the sulphur dioxide solvent is permitted to distill. The residue is decanted onto ice to destroy the unchanged chloromethyl methyl ether. A two phase product is thereby formed. The organic phase is separated, dried over anhydrous sodium sulphate, and then distilled at reduced pressure. A center cut from this distillation is distilled a second time. By infrared spectroscopy, it is determined that the fraction distilling at 90° C. at 80 mm. mercury pressure is 3-chloro-2,3-dimethyl butyl methyl ether.

3-chloro-2,3-dimethyl butyl methyl ether (15 grams) is mixed with 75 grams of N-methylpyrrolidone and heated at 125° C. for two hours. 2,3-dimethyl-1,3-butadiene (7.9 grams) is recovered. Thus, 2,3-dimethyl-1,3-butadiene, a valuable monomer, can be formed by the method of this invention.

In addition to preparing 3-chloro-2,3-dimethyl butyl methyl ether by the reaction of 2-methyl-2-butene with chloromethyl methyl ether in the presence of sulphur dioxide, this material can be prepared by the addition of chloromethyl methyl ether to 2-methyl-2-butene in the presence of a catalyst, such as titanium tetrachloride or zinc chloride.

EXAMPLE 12

Chloromethyl methyl ether (80.5 g.; 1 mole) mixed with titanium tetrachloride (3.8 g.; 0.02 mole) is added dropwise during a one-hour period to 2-methyl-2-butene (70 g.; 1 mole) at 10° C. The mixture is stirred an additional 1.5 hours without cooling to form 3-chloro-2,3-dimethylbutyl methyl ether in 95% yield by GLC analysis. N-methylpyrrolidone (250 g.) is added and the mixture is heated at 125° C. for four hours. 2,3-dimethyl-1,3-butadiene is collected from the distillation receiver as a mixture with methanol, methyl chloride and the unsaturated ethers 2,3-dimethyl-3-butenyl methyl ether and 2,3-dimethyl-2-butenyl methyl ether. Distillation of this mixture through a spinning band apparatus gives 2,3-dimethyl-1,3-butadiene of over 99% purity. The yield is 82%, based on chloromethyl methyl ether charged initially. In addition, a fraction (wt. 11 g.) collects between 98 and 104° C. at 621.0 mm. Hg which is mostly 2,3-dimethyl-3-butenyl methyl ether and 2,3-dimethyl-2-butenyl methyl ether in about equal amounts. These materials are contaminated with about 5–10% of a compound containing a reactive chlorine atom (silver nitrate test) which is probably 1-chloro-2,3-dimethyl-2-butenyl methyl ether. The refractive index of this moderately pure ether mixture is 1.4182 at 20° C. The yield of 2,3-dimethyl-1,3-butadiene is better than 95% if the calculations take into account the 11 g. of unconverted intermediate ethers.

EXAMPLE 13

3-methyl-2,4-pentadiene can be prepared by the method of this invention.

Chloromethyl methyl ether (80.5 g.; 1 mole) is added to 70 grams of 2-methyl-1-butene (1 mole) in 500 grams of liquid sulphur dioxide. The reaction mixture is stirred for seven hours at —9° C. and then the sulphur dioxide is distilled. The reaction product is decanted onto ice to form a two-phase product. The organic phase is separated, dried over anhydrous sodium sulphate and distilled at reduced pressure. A fraction distilling at between 59° C. and 60.5° C. at 62.3 mm. mercury is found to be about 50% 3-chloro-3-methyl pentyl methyl ether. This material can be readily converted to 3-methyl-2,4-pentadiene by refluxing it with N-methylpyrrolidone. It is found that the 3-chloro-3-methyl pentyl methyl ether prepared as above is contaminated with its unsaturated ether derivative, indicating that some HCl was eliminated during the distillation. Additionally, large amounts of 3-chloro-2,3-dimethyl butyl methyl ether (the 2-methyl-2-butene adduct) are also contained in the mixture. This indicates that the 2-methyl-1-butene is partially isomerized under the reaction conditions to form 2-methyl-2-butene. This does not occur to a significant extent when chloromethyl methyl ether and zinc chloride or titanium tetrachloride is added to 2-methyl-1-butene in the absence of solvent.

EXAMPLE 14

2-phenyl-1,3-butadiene is prepared by adding 0.5 mole of chloromethyl methyl ether to 0.5 mole of α-methyl styrene in the presence of 4 grams of zinc chloride at room temperature. The reaction mixture is stirred for 48 hours and then poured onto ice. The organic layer is extracted with chloroform, dried and the low boiling components removed by flash distillation at reduced pressure. The crude product weighs 88 grams. This adduct is 2-chloro-2-phenylbutyl methyl ether. By passing the crude adduct through a glass tube packed with ceramic beads and maintained at a temperature of 550° C., 2-phenyl-butadiene is obtained.

EXAMPLE 15

1-butene (0.25 mole) is bubbled through a mixture of 0.25 mole of chloromethyl methyl ether and 0.25 gram of zinc chloride maintained at a temperature between 0° C. and 10° C. Following the addition of the 1-butene, the reaction mixture is allowed to exotherme to 35° C. and then cooled again to 10° C. The crude product is flash distilled from the catalyst residue and by gas liquid chromatography, it is determined that 3-chloropentyl methyl ether was formed. By heating the 3-chloropentyl methyl ether in the presence of N-methylpyrrolidone and a metal halide catalyst, piperylene can be formed.

EXAMPLE 16

2-butene (0.25 mole) is bubbled into a mixture of 0.25 mole of chloromethyl methyl ether and 0.5 gram of zinc chloride maintained at a temperature of between 0° C. and 10° C. The reaction product is distilled through a spinning band (platinum band apparatus) and a large fraction collected at 39.5° C. at a pressure of 17 mm. mercury. Gas liquid chromatography indicates that this fraction is 96% to 98% pure 3-chloro-2-methylbutyl methyl ether. A 75% yield of this material is obtained.

3-chloro-2-methylbutyl methyl ether can be readily converted to isoprene. 3-chloro-2-methylbutyl methyl ether (10.7 grams) and 3.1 grams of lithium chloride were refluxed at 135° C. in dimethylformamide for 20 hours. A 10% yield of isoprene is obtained. By distilling the residue of this distillation, a product distilling at 91° C. at 619.5 mm. mercury is obtained. By infrared and nuclear magnetic resonance spectroscopy, it is determined that this material is 2-methyl-2-butenyl methyl ether.

EXAMPLE 17

High yields of isoprene can be obtained from 3-chloro-2-methylbutyl methyl ether. 3-chloro-2-methylbutyl methyl ether (0.146 mole) and 0.146 mole of lithium chloride are heated in 100 g. of N-methylpyrrolidone at a temperature in the range of from 150–160° C. for five hours. A 74% yield of isoprene is obtained.

EXAMPLE 18

Isoprene can be prepared by the reaction of bischloromethyl ether with isobutylene to yield an adduct which is cleaved to isoprene.

A mixture of 57.5 grams bis-chloromethyl ether (0.5 mole) and 2 grams of zinc chloride are placed in a 500-ml. 3-neck round bottom flask fitted with a magnetic stirrer, thermometer and subsurface gas inlet tube. Isobutylene (73.9 grams) is bubbled into the mixture over a period of three hours. The temperature of the reaction mixture is maintained between 30° C. and 45° C. during the course of the isobutylene addition. N-methylpyrrolidone (250 grams) is then added to the crude reaction product, followed by heating at 140° C. for six hours. Isoprene (25 grams) is obtained. Based on the amount of bis-chloromethyl ether employed as starting material, a 37% yield of isoprene is obtained.

EXAMPLE 19

Finely ground anhydrous zinc chloride (0.025 mole) is stirred into one mole of 1-chloro-2-methylpropyl methyl ether. One mole of isobutylene is stirred into the mixture and the temperature is maintained at 0–10° C. After 18 hours, the catalyst is removed and the reaction mixture is distilled under vacuum to recover 2,5-dimethyl-2-chloro-4-methoxyhexane which on cleavage in N-methylpyrrolidone is converted to 2,5-dimethyl-2,4-hexadiene, a raw material in the manufacture of pyrethrin-type insecticides.

EXAMPLE 20

Zinc chloride (2 g.; 0.015 mole) is added to 68.1 grams of chloromethyl methyl ether in a 500-ml. 3-neck round bottom flask fitted with a magnetic stirrer, thermometer and subsurface gas inlet tube. Isobutylene (74.5 g.) is bubbled into the mixture over a period of 3¼ hours. During this addition, the temperature of the mixture is maintained between 0° C. and 25° C. Following this, the excess isobutylene is removed from the mixture by bubbling dry nitrogen gas through it for 45 minutes.

N-methylpyrrolidone (111.6 g.) is added to the crude 3-chloro-3-methylbutyl methyl ether formed as above. Upon distillation, 0.76 mole of isoprene is obtained. Based on the amount of chloromethyl methyl ether employed, 91.5% yield of isoprene is obtained.

EXAMPLE 21

Equimolar amounts of allylchloride and chloromethyl methyl ether are reacted at 60° in the presence of aluminum chloride to obtain 3,4-dichlorobutyl methyl ether.

3,4-dichlorobutyl methyl ether (10 ml.; over 90% pure according to GLC) is distilled into a 1" x 18" Vigreaux column (packed with ceramic beads) maintained at 400° C. during a period of two hours. The operating pressure is 100 mm. Hg. Products are collected in a series of two receivers. The first receiver, in which heavy materials are collected, is simply a glass receiver fitted to an ordinary chilled water condenser. Very volatile materials are collected in a Dry Ice trap. Roughly 3 ml. of material is found in the receiver and 2 ml. in the Dry Ice trap. Presumably, about half of the starting material forms tar on the cracking column. Some HCl is lost through the vacuum system; this could account for quite a bit of the weight loss in this experiment. The infared spectrum of the 2 ml. collected in the Dry Ice trap shows a lot of olefin present, but does not conclusively show chloroprene to be present. GLC analysis of this material indicates ten components present. A spike with an authentic sample of chloroprene matches one of the ten peaks under two different flow conditions. It seems unlikely that this match would be fortuitous under two different sets of conditions, hence this GLC analysis constitutes our evidence for the formation of chloroprene. The yield is estimated to be 5%.

3,4-dichlorobutyl methyl ether (21 g.; 0.135 mole; 98% pure by GLC analysis) and LiCl (5.7 g.; 0.135 mole) are heated in dimethylformamide (125 ml.) at the reflux temperature of the mixture (143° C.) for 28 hours. GLC analysis indicates incomplete conversion of the starting material so 5 g. additional LiCl is added and the mixture refluxed another 12 hours. At this point, all starting material has been converted. There is no evidence for the formation of chloroprene. The products resulting from the elimination of one molecule of HCl are isolated in excellent yield. These are separated into fractions of fairly high purity by distillation through a spinning band (platinum band) apparatus.

Infrared analysis of the purified products, together with their GLC analysis and that of the original crude reaction mixture, indicates that the materials were formed in yields of: 4-chloro-3-butenylmethyl ether 35%, and 4-chloro - 2-butenylmethyl ether and 3-chloro - 3-butenylmethyl ether 49%. The ethers are then cleaved to obtain the desired diene, including chloroprene and 1-chloro-1,3-butadiene.

EXAMPLE 22

A commercial sample of a mixture of 1- and 2-chloropropenes is distilled through a spinning band apparatus to obtain a fraction enriched in 2-chloropropene. Of this sample, 27.4 g. (GLC shows 73.4% 2-chloropropene, 14.3% 1-chloropropene and 12.3% miscellaneous) is mixed with zinc chloride (2 g.; anhydrous, granular) in a 3-neck round bottom glass flask fitted with thermometer, magnetic stirrer, upright Dry Ice condenser and dropping funnel (pressure equalizing type). Eastman reagent grade chloromethyl methyl ether (32 g.; .40 mole) is added dropwise over a period of ¼ hour. The temperature is maintained at about 10° C. during the first half of the addition. During the last half of the addition, the mixture is permitted to reflux (40–45° C.). The mixture is gradually warmed to about 40° C. and purged with $N_2$ to remove unchanged chloropropenes. Crude chloropropenes (9.4 g.) are collected in a Dry Ice trap by this purging. Recovered in this trapped material are: 2-chloropropene (1.9 g.); cis and trans 1-chloropropene (2.6 g.) and chloromethyl methyl ether (3.1 g.).

The crude product is treated with water (200 ml.) and stirred vigorously for five minutes. The bottom phase (organic) is separated and stored over anhydrous $Na_2SO_4$. GLC analysis of this 35.0 g. of crude 3,3-dichlorobutyl methyl ether indicates the yield is 30.4 g. (0.194 mole). Based on unrecovered 2-chloropropene [18.4 g. (0.24 mole) out of 20.3 g. charged] the yield is 81%. 1-chloropropene is somewhat less reactive, and very little of the corresponding adduct was formed. 1-chloropropene recovery is 2.6 g. out of 3.9 g. charged.

The crude 3,3-chlorobutyl methyl ether is distilled through a spinning band apparatus (platinum band). The material collected at 40° C. at 10 mm. Hg is shown by infrared and n.m.r. spectroscopy and gas-liquid chromatographic analysis to be 98+% 3,3-dichlorobutyl methyl ether. The material had $N_D^{20}$ 1.4404.

Pure 3,3-dichlorobutyl methyl ether is charged to the pyrolysis apparatus of Example 21. Using the same operating conditions, chloroprene is recovered in toluene diluent in a Dry Ice trap.

Additionally, 3,3-dichlorobutyl methyl ether (0.1 mole) is added to N-methylpyrrolidone (100 ml.) containing lithium chloride (4.2 g.; 0.1 mole). The mixture is heated in an ordinary distillation apparatus at 150° C. for three hours. A continuous nitrogen purge sweeps the chloroprene into a Dry Ice trap where it is recovered.

EXAMPLE 23

1-chloropropene (contains about equal amounts of cis and trans isomers; purity 95% by GLC; 80.5 g. or 1 mole active substrate) and zinc chloride (4 g.) are mixed in the apparatus described in Example 22. Chloromethyl methyl ether (reagent grade; 88 g. or 1.1 mole) is added dropwise over a period of 45 minutes. The reaction temperature varies between 25° C. initially and 40° C. at the end of the addition. The higher reaction temperature is used since 1-chloropropene is somewhat less reactive than 2-chloropropene in this addition. The mixture is stirred an additional two hours at room temperature, and then worked up. Recovered from the nitrogen purge is 5 g. of chloromethyl methyl ether. The conversion of 1-chloropropene is 100%. GLC analysis of the crude dry product indicates 110 g. of 2,3-dichlorobutyl methyl ether are present. The yield based on 1-chloropropene charged is 70%. A portion of the crude material is distilled through a spinning band apparatus at 10 mm. Hg. A fraction is shown by infrared and n.m.r. spectroscopy and gas-liquid chromatographic analysis to be 98+%, 2,3-dichlorobutyl methyl ether.

This material is converted to chloroprene under the same conditions as given in Example 22. Yields are comparable.

EXAMPLE 24

In a series of runs, the substrate (freshly distilled under vacuum, purity 90+%) and the solvent are charged to an ordinary 3-neck round bottom glass flask fitted with magnetic stirrer, thermometer and 1″ x 18″ Vigreaux section. A variable reflux head serves as take-off for the distillate. The charge is heated for the time indicated at the temperature indicated. Distillate is collected when the reflux temperature overhead approaches that of pure isoprene. In some cases, distillate is collected at a higher temperature after prolonged heating does not lead to the desired low overhead reflux temperature. The distillate is weighed and analyzed by gas-liquid chromatography. Very low boiling materials which by-passed the overhead reflux condenser are collected in a Dry Ice trap. These materials are checked by infrared spectroscopy. In many cases, the distillation pot residue is analyzed (GLC) to determine degree of conversion of 3-chloro-3-methylbutyl methyl ether.

Isoprene reported as formed in these runs is to be considered as in excess of the small amount which might have been present in the initial substrate charge, or formed by simple base catalyzed elimination of HCl from isoprene hydrochloride present in the initial charge. Generally, the major impurities in the 90+% pure 3-chloro-3-methylbutyl methyl ether charge are the unsaturated ether intermediates. Table II summarizes the data.

EXAMPLE 25

Chloromethyl methyl ether (Matheson reagent grade; 1.0 mole) is added dropwise during a period of one hour to a mixture of 4-vinylcyclohexene (Phillips Petroleum Company 99% pure; 1.0 mole) and mercuric chloride (Fischer reagent, 6 g.) and is maintained at 20° C. The reaction mixture does not exotherme noticeably; the reaction appears to be rather slow. The mixture is stirred two days at room temperature and then it is subjected to a flash distillation at 53 mm. Hg pressure. Roughly half the 4-vinylcyclohexene and chloromethyl methyl ether is recovered unchanged. When the residue from this first distillation is partially distilled at 4 mm., only decomposition products started to distill. The material was finally distilled at ~10µ pressure. Roughly 20 g. of high boiling residue remained. This residue is believed to be the adduct formed when two molecules of $ClCH_2OCH_3$ add to one 4-vinylcyclohexene. Identification of this material will be discussed below.

TABLE II.— STUDIES IN LABORATORY DISTILLATION APPARATUS

| Solvent (wt. g.) | | Substrate Charge (g.) | Reaction | | Wt. Ovhd. Distillate (g.) | Yield, Mole, Percent | | Materials in Dry Ice Trap (Overhead) |
|---|---|---|---|---|---|---|---|---|
| | | | Time (hr.) | Temp. (° C.) | | Isoprene | Unsat. Ethers | |
| N-methylacetamide | 76.2 | 26 | 1.5 | 125–150 | 16.2 | 45 | 40 | |
| Triethylamine | 75 | 25 | 7 | 80– 90 | 15.7 | 0 | <5 | |
| o-Chloroaniline | 121 | 48 | 2 | 140–150 | 22.5 | 18 | 29 | Isoprene (1 g.); Isobutylene, $CH_3Cl$, trace. |
| m-Chloroaniline | 121 | 47.3 | 1 | 140–150 | 13.1 | ¹ 2.5 | 14 | Isobutylene (trace), Isoprene (1 g.) |
| Acetamide | 100 | 47.3 | 30 | ² 85– 90 | 29.2 | ¹ 60 | ~3 | Isoprene (2 g.), $CH_3OH$ (.2 g.), $CH_3Cl$ (trace). |
| Urea | 100 | 47.8 | 25 | 100–130 | 17.4 | 1 | 80 | $NH_3$ (2–3 g.). |
| Xylene | 300 | 47.5 | 21 | 115–130 | (³) | ~5 | ~20 | 10.3 g. total contd. HCl, isoprene, $CH_3Cl$ and isoprene hydrochloride. |
| Diphenylamine | 100 | 47.5 | 18 | 100–125 | 14.6 | ¹ ~10 | ~10 | ~1 g. of a mixture of isoprene and $CH_3Cl$. |

¹ There is evidence that isoprene yield is higher but that isoprene polymerizes in the distillation pot during the period of reflux.
² About 150 for last 1 hr.
³ Not distilled (pot analyzed to get yields).

The materials collected at up to 80° C. at 10μ pressure are washed with water, are dried over anhydrous Na₂SO₄, and are redistilled. About 2 g. of material are collected at 38–42° C. at 90μ. GLC analysis showed two major components and a few minor components. The two major peaks (70% of the sample) are believed to be due to the two possible mono-adducts of chloromethyl methyl ether with 4-vinylcyclohexene, 3(3-cyclohexenyl)-3-chloropropylmethyl ether and the isomers 2-chloro-5-vinylcyclohexylmethyl methyl ether and 2-chloro-4-vinyl-cyclohexylmethyl methyl ether. The infrared spectrum of this material shows both the absorptions characteristic of a cycyohexene double bond and those characteristics of the terminal vinyl double bond. The molecular weight is 174.7 (188.5 is calculated for these adducts).

A slightly higher boiling fraction (10 g.), collected at 65° C. at 40μ pressure, is found by GLC analysis to be 9.1% miscellaneous lower boilers, 51% of one of the mono-adducts, 33% of another of the mono-adducts, and 7.3% of a material believed to be derived by splitting out HCl from the di-adduct. The molecular weight of this sample is very close to the theoretical value for a monoadduct (186.6 found vs. 188.5 calculated). Elemental analysis: Calculated; C, 63.5; H, 9.1; Cl, 18.8; O, 8.47. Found; C, 64.32; H, 9.11; O, 10.20; Cl, 17.35. The high values for O and C and the low value for Cl support the idea that the 9.1% of low boilers in the sample are derived from splitting HCl out of the mono-adducts and that the 7.3% of higher boiling materials are derived by splitting HCl from the di-adduct.

The 20 g. of very high boiling materials referred to earlier were distilled. Five grams of distillate were collected at 60–95° C. at 5μ pressure. The infrared spectrum of the material shows only a trace of double bond absorption. GLC analysis shows that very minor amounts of the mono-adducts are present in the sample. Strong absorptions characteristic of the ether functional group were found. The molecular weight of the material was 223.8; calculated for the di-adduct is 269. If one molecule of HCl split out, the molecular weight would be 232.2. The molecular weight and infrared spectra (very weak double bond absorption) indicate the material is 2-methoxymethyl-5-(1-chloro-3-methoxypropyl)-1-cyclohexene. On cleavage of the ether adducts in N-methylpyrrolidone, the conjugated dienes form.

EXAMPLE 26

To a 500-ml. flask fitted with a magnetic stirrer, upright chilled water reflux condenser with attachment to Drierite tower, and thermometer are added 200 ml. of ethyl ether, 2 g. of zinc chloride and 95.6 g. of chloromethyl methyl ether (98% pure; 1.16 moles). The mixture is cooled with an ice bath while isoprene (79.2 g.; 1.16 moles) in diethyl ether (50 ml.) is added dropwise via an addition funnel fitted with a pressure equalizing side tube. The mixture is stirred three hours after the addition is complete; at this point, the ice bath is removed and the mixture exotherms to about 30° C. The crude product is poured into ice water, the organic phase is collected, is washed with five 500 ml. portions of water, and is then dried over anhydrous sodium sulfate. GLC analysis of the crude, dry material (wt. 148 g.) shows about 30% low boiling impurities and a single large peak. A small sample of this material is distilled through a 12″ Hemple column packed with glass helices. A center cut is collected at 44.5 to 45° C. at 2.3 mm. Hg and has a molecular weight of 144 (148 calculated for the adduct); $N_D^{23}$ 1.4616 (literature gives only $N_D^{20}$ 1.4600 for the ethyl ether analog); and infrared and n.m.r. spectra in accord with the structure 3-methyl-5-chloro-3-pentenyl methyl ether. Thus, the yield of the intermediate, based on GLC analysis (uncalibrated area ratios) of the crude, dry mixture is 89 g. (0.6 mole) or 60%.

A 40 g. portion of the crude intermediate is cracked to the triene by adding it dropwise to 200 g. of 5 wt.- percent HCl in N-methyl-2-pyrrolidone in an ordinary distillation set up using the 12″ Hemple column as previously described. Two Dry Ice traps in series are used to collect lower boiling products. The decomposition temperature used is between 140–160° C. The reaction is carried out in the presence of a gentle nitrogen sweep. Crude product (15 g.; 60% triene according to GLC analysis) is collected. This corresponds with a yield of pure 2-vinyl-1,3-butadiene of 55%, based on pure intermediate charged to the decomposition step.

Careful distillation of the crude triene through a semimicro spinning band apparatus (platinum band) gives 3–4 g. of product distilling at 18° C. at 195 mm. GLC analysis of the purified material shows a purity of 94%. The infrared and n.m.r. spectra are in accord with the structure 2-vinyl-1,3-butadiene; previously published data (Bailey) on the infrared spectrum is clearly in error. Fractions collected at 55–58° C. at 75 mm. prove to be the decomposition intermediate, 3-methyl-2,4-pentadienyl methyl ether and/or 1-methoxyethyl-1-vinyl ethylene. GLC analysis shows a single major peak constituting 95% of the sample. The infrared spectrum shows absorptions characteristic of a conjugated diene and of the ether linkage. $N_D^{25.5}$ is 1.4489. The yield of this intermediate is not determined, but it appears that if this material were taken into account the yield of the triene would be considerably better than 55%.

Obviously, it is intended that the α-haloether, olefin, solvent, complexing or salt forming agents, etc., used at various points in the described process be substantially unreactive with other components of the reaction mixtures except for their intended purpose.

While the above specific examples and general discussion illustrate this invention, it is not intended that the invention be limited thereby. It is intended that the invention be limited only by the scope of the claims.

Now having described the invention, what is claimed is:

1. The process for the preparation of polyolefinic compounds comprising reacting an alpha haloether with a reactive olefin to form a haloether adduct of the olefin, splitting hydrogen halide and alcohol from the haloether adduct to form a polyolefinic compound, and separating the hydrogen halide and the polyolefinic compound.

2. The process comprising reacting an alpha haloether with a reactive olefin in the presence of a Friedel-Crafts catalyst to form a haloether adduct of the olefin, splitting hydrogen halide and alcohol from the haloether adduct to form a polyolefinic compound, separating the hydrogen halide from the polyolefinic compound substantially as formed, and recovering the hydrogen halide and the polyolefinic compound.

3. The process for preparing conjugated polyolefinic compounds comprising reacting an alpha haloether with a reactive olefin in the presence of a Friedel-Crafts catalyst at temperatures ranging from about −30 to about 70° C. to form a haloether adduct of the olefin, splitting hydrogen halide and alcohol from the halother adduct at temperatures ranging from about 50 to about 500° C. to form a polyene, and separating the hydrogen halide from the polyene substantially as formed.

4. The process of claim 3 wherein the alpha haloether is reacted with the olefin at temperatures ranging from about 5 to about 35° C. and the hydrogen halide and alcohol are split from the haloether adduct in the presence of a protonic catalyst at temperatures ranging from about 90 to about 250° C.

5. The process of claim 3 wherein the Friedel-Crafts catalyst is selected from the group consisting of zinc chloride, titanium tetrachloride, aluminum trichloride, ferric chloride, and mercuric chloride.

6. The process comprising reacting an alpha haloether with a reactive olefin in the presence of a Friedel-Crafts catalyst to form a haloether adduct of the olefin, splitting hydrogen halide and alcohol from the haloether adduct in the presence of a solvent selected from the group consisting of hydrogen halide complexing solvents and solvents in which hydrogen halide is preferentially soluble and which form a second phase with the reaction mixture to form a polyolefinic compound, and separating the hydrogen halide from the polyolefinic compound substantially as formed.

7. The process of claim 6 wherein the solvent is N-methylpyrrolidone.

8. The process of claim 6 wherein the solvent is dimethylformamide.

9. The process of claim 6 wherein the solvent is lower alkanol.

10. The process of claim 6 wherein the solvent is methanol.

11. The process of claim 6 wherein the solvent is ethanol.

12. The process of claim 6 wherein the hydrogen halide and alcohol are split out at 90–250° C.

13. The process comprising reacting an alpha haloether with a reactive olefin at temperatures ranging from about 30 to about 70° C. and in the presence of about 0.01 to about 0.05 mole of Friedel-Crafts catalyst per mole of alpha-haloether to form a haloether adduct of the olefin, splitting hydrogen halide and alcohol from the haloether adduct at temperatures ranging from about 50 to about 500° C. to form a polyolefinic compound, separating the hydrogen halide from the polyolefinic compound, and recovering the hydrogen halide and polyolefinic compounds.

14. The process comprising reacting an alpha haloether with a reactive olefin in the presence of a Friedel-Crafts catalyst at temperatures ranging from about 5 to about 35° C. to form a haloether adduct of the olefin, splitting hydrogen halide and alcohol from the haloether adduct at temperatures ranging from about 90 to about 250° C. in the presence of a metal halide catalyst to form a polyene, and separating the polyene from the hydrogen halide substantially as formed.

15. The process comprising reacting a chloromethyl, lower alkyl ether with a reactive olefin selected from the group consisting of hydrocarbon-substituted olefins and halo-substituted olefins having 2–9 carbon atoms in the presence of from about 0.01 to about 0.5 mole of Friedel-Crafts catalyst per mole of chloromethyl, lower alkyl ether at temperatures ranging from about −30 to about 70° C. to form a haloether adduct of the olefin, splitting hydrogen halide and an alcohol from the resulting haloether adduct of the olefin to form a conjugated polyolefinic compound at 50–500° C. in the presence of a catalyst selected from the group consisting of metal halide catalysts and metal oxide catalysts, and separating the hydrogen halide from the polyolefinic compound.

16. The process of claim 15 wherein the hydrogen halide is recovered after separation from the polyolefinic compound.

17. The process of claim 15 wherein the polyolefinic compound is recovered after separation from the hydrogen halide.

18. The process comprising reacting a monochloromethyl, lower alkyl ether with a reactive olefin selected from the group consisting of hydrocarbon-substituted olefins and halo-substituted olefins having 2–9 carbon atoms in the presence of a Friedel-Crafts catalyst at temperatures ranging from about 5 to about 35° C. to form a haloether adduct of the olefin, splitting hydrogen halide and an alcohol from the resulting haloether adduct to the olefin in the presence of a protonic catalyst and at temperatures ranging from about 90 to about 250° C. to form a polyolefinic compound, and separating the hydrogen halide and the polyolefinic compound.

19. The process for the preparation of isoprene comprising reacting chloromethyl methyl ether with a reactive butene in the presence of a Friedel-Crafts salt catalyst at temperatures ranging from about 30 to about 70° C. to form a chloromethylbutyl methyl ether, splitting hydrogen chloride and methanol from the chloromethylbutyl methyl ether at temperatures ranging from about 90 to about 250° C. in the presence of a metal halide catalyst to form isoprene, and separating the hydrogen halide and isoprene substantially as formed.

20. The process for the preparation of chloroprene comprising reacting chloromethyl methyl ether with a mono-chloropropene at temperatures ranging from about 5 to about 35° C. and in the presence of a Friedel-Crafts catalyst to form a dichlorobutyl methyl ether, splitting hydrogen halide and alcohol from the dichlorobutyl methyl ether in the presence of a metal halide catalyst, and separating the resulting chloroprene from the hydrogen halide.

21. The process for the preparation of fluoroprene comprising reacting chloromethyl methyl ether with 2-fluoropropene at temperatures ranging from about 5 to about 35° C. and in the presence of a Friedel-Crafts catalyst, cleaving the resulting chlorofluorobutyl methyl ether, splitting hydrogen chloride and methanol from the chlorofluorobutyl methyl ether in the presence of a metal halide catalyst to form fluoroprene, and separating the hydrogen chloride from the fluoroprene.

22. The process for producing a haloprene comprising reacting a halomethyl ether with a halopropene in the presence of a Friedel-Crafts catalyst at from about −30 to about 70° C. to form a haloether adduct of the halopropene, splitting hydrogen halide and methanol from the resulting haloether adduct of the halopropene to form a haloprene at 50–500° C. and in the presence of a catalyst selected from the group consisting of Friedel-Crafts salt catalysts and metal oxide catalysts, and separating the haloprene and hydrogen halide.

23. The process of claim 22 wherein the hydrogen halide is recovered after separation from the haloprene.

24. The process of claim 22 wherein the haloprene is recovered after separation from the hydrogen halide.

25. The process of claim 22 wherein the hydrogen halide and methanol are split out in the presence of a solvent.

26. The process of claim 22 wherein the hydrogen halide and methanol are split out in the presence of a solvent selected from the group consisting of hydrogen halide complexing solvents and solvents in which hydrogen halide is preferentially soluble and which form a second phase with the reaction mixture.

27. The process of claim 22 wherein the hydrogen halide and methanol are split out in the presence of tertiary amide solvent.

28. The process of claim 22 wherein the hydrogen halide and methanol are split out in the presence of lower alkanol.

29. The process of claim 22 wherein the hydrogen halide and methanol are split out in the presence of methanol.

30. The process of claim 22 wherein the Friedel-Crafts catalyst is zinc chloride.

31. The process of claim 22 wherein the Friedel-Crafts catalyst is titanium tetrachloride.

32. A process for the preparation of conjugated polyolefins comprising reacting hydrogen halide with lower alkyl alcohol and lower alkyl aldehyde at temperatures of from about 20 to about 35° C. to form a lower α-haloalkyl ether, reacting the resulting lower α-haloalkyl ether with a reactive olefin selected from the group consisting of hydrocarbon-substituted olefins and halo-substituted olefins having 2–9 carbon atoms in the presence of about 0.01 to about 0.05 mole of Friedel-Crafts catalyst per mole of lower α-haloalkyl ether to form a haloether adduct of the olefin, splitting hydrogen halide and a lower alkyl alcohol from the haloether adduct of the olefin to form a polyolefin, separating hydrogen halide and the polyolefin, and reacting the hydrogen halide and lower alkyl alcohol with additional lower alkyl aldehyde to form additional lower α-haloalkyl ether.

33. The process of claim 32 wherein the α-haloalkyl ether is a chloromethyl ether and the olefin is a butene.

34. The process of claim 33 wherein the reaction between the α-haloalkyl ether and the olefin is carried out at temperatures ranging from about −30 to about 70° C. and hydrogen halide and alcohol are split from the haloether adduct of the olefin at temperatures ranging from about 50 to about 500° C.

35. The process for the preparation of isoprene comprising reacting hydrogen halide with methanol and formaldehyde to form chloromethyl methyl ether, reacting the chloromethyl methyl ether with a butene selected from the group consisting of 2-methylpropene and 2-butene in the presence of about 0.01 to about 0.05 mole of Friedel-Crafts catalyst per mole of chloromethyl methyl ether to form 3-chloro-3-methylbutyl methyl ether, splitting hydrogen halide and methanol from the 3-chloro-3-methylbutyl methyl ether to form isoprene in the presence of a protonic catalyst, separating the hydrogen halide and methanol from the isoprene, and reacting the hydrogen halide and methanol with additional formaldehyde to form additional chloromethyl methyl ether.

36. The process of claim 35 wherein the selected butene is contained in a $C_4$ refinery stream.

37. The process of claim 35 wherein the reaction between the selected butene and the chloromethyl methyl ether is carried out at a temperature ranging from about −5 to about 35° C. and the hydrogen and methanol are split from 3-chloro-3-methylbutyl methyl ether at temperatures ranging from about 90 to about 250° C.

38. The process of claim 37 wherein the hydrogen halide and methanol are split out in the presence of a solvent selected from the group consisting of hydrogen halide complexing solvents and solvents in which hydrogen halide is preferentially soluble and which form a second phase with the reaction mixture.

39. The process of claim 37 wherein the hydrogen halide and methanol are split out in the presence of tertiary amide solvent.

40. The process of claim 37 wherein the hydrogen halide and methanol are split out in the presence of N-ethylpyrrolidone.

41. The process of claim 37 wherein the solvent is N-methylpyrrolidone.

42. The process of claim 37 wherein the solvent is dimethylformamide.

43. The process of claim 37 wherein the solvent is methanol.

44. The process of claim 37 wherein the solvent is ethanol.

45. The process of claim 37 wherein the solvent is propanol.

46. The process comprising reacting an alpha haloether with a reactive olefin in the presence of a Friedel-Crafts catalyst to form a haloether adduct of the olefin, splitting hydrogen halide from the haloether adduct to form an olefinic ether, separating the hydrogen halide from the olefinic ether, and thereafter splitting an alcohol from the olefinic ether to form a conjugated polyene.

47. The process comprising reacting an alpha haloether with a reactive olefin in the presence of a Friedel-Crafts catalyst to form a haloether adduct of the olefin, splitting hydrogen halide from the haloether adduct in the presence of a Friedel-Crafts salt catalyst to form an olefinic ether, and thereafter splitting an alcohol from the olefinic ether in the presence of a protonic catalyst to form a conjugated polyene.

48. The process for preparing polyolefinic compounds comprising reacting a haloether with a reactive olefin in the presence of a Friedel-Crafts salt catalyst at temperatures ranging from about −30 to about 70° C. to form a haloether adduct of the olefin, splitting hydrogen halide from the haloether adduct in the presence of a Friedel-Crafts salt catalyst to form an olefinic ether, separating the hydrogen halide from the olefinic ether, and splitting an alcohol from the olefinic ether at temperatures ranging from about 150 to about 650° C.

49. The process of claim 48 wherein alcohol is split from the olefinic ether in the presence of a metal oxide catalyst.

References Cited
UNITED STATES PATENTS 2,922,822   1/1960   Beach _____ 260—681

OTHER REFERENCES

Tokura et al. "The Reaction of Isobutene with Chloromethyl Methyl Ether in Liquid $SO_2$," Bull. Chem. Soc. Japan 35(5) 721–2 (1962) C.A. 57 8419e.

PAUL M. COUGHLAN, Jr., *Primary Examiner.*

DANIEL D. HORWITZ, *Examiner.*

G. E. SCHMITKONS, *Assistant Examiner.*

UNITED STATES PATENT OFFICE
CERTIFICATE OF CORRECTION

Patent No. 3,360,583                  December 26, 1967

David W. Hall et al.

It is hereby certified that error appears in the above numbered patent requiring correction and that the said Letters Patent should read as corrected below.

Column 5, line 49, for "sufate" read -- sulfate --; column 11, line 6, for "cis and trans" read -- cis and trans --; line 36, for "cis" read -- cis --; line 37, for "trans" read -- trans --; columns 11 and 12, TABLE II, eight column, line 3 thereof, for "29" read -- 39 --; column 13, line 23, for "analysis" read -- Analysis --.

Signed and sealed this 1st day of April 1969.

(SEAL)
Attest:

Edward M. Fletcher, Jr.                  EDWARD J. BRENNER
Attesting Officer                         Commissioner of Patents